United States Patent
Morgans

(10) Patent No.: US 7,080,846 B2
(45) Date of Patent: Jul. 25, 2006

(54) DETACHABLE WHEEL COVER

(76) Inventor: Robert Stanley Morgans, 19 Oak End Close, Southborough, Tunbridge Wells, Kent TN4 0TE (GB)

( * ) Notice: Subject to any disclaimer, the term of this patent is extended or adjusted under 35 U.S.C. 154(b) by 0 days.

(21) Appl. No.: 10/527,304

(22) PCT Filed: Aug. 6, 2003

(86) PCT No.: PCT/GB03/03400

§ 371 (c)(1),
(2), (4) Date: Mar. 8, 2005

(87) PCT Pub. No.: WO2004/028834

PCT Pub. Date: Apr. 8, 2004

(65) Prior Publication Data

US 2005/0242543 A1    Nov. 3, 2005

(30) Foreign Application Priority Data

Sep. 16, 2002  (GB) ................. 0221442.7

(51) Int. Cl.
B62D 25/18 (2006.01)
(52) U.S. Cl. ............... 280/152.05; 224/42.2; 224/224; 224/42.12
(58) Field of Classification Search ......... 280/152.05, 280/157, 160, 152.1, 152.2; 206/303, 304, 206/304.1; 296/37.3, 37.2; 220/4.22, 4.24, 220/520; 224/315, 328, 42.2, 42.12
See application file for complete search history.

(56) References Cited

U.S. PATENT DOCUMENTS

| 1,244,417 | A | * | 10/1917 | Brosman | 206/304 |
|---|---|---|---|---|---|
| 1,398,259 | A | * | 11/1921 | Dube | 206/304.1 |
| 1,508,419 | A | | 9/1924 | Sundback | |
| 1,629,777 | A | * | 5/1927 | Dahl | 206/304 |
| 1,658,696 | A | * | 2/1928 | Walrath | 206/304 |
| 1,917,157 | A | * | 7/1933 | Ricci | 206/304 |
| 2,189,407 | A | * | 2/1940 | Rueppel | 206/304 |
| 2,588,957 | A | * | 3/1952 | Brown | 220/4.22 |
| 3,593,898 | A | * | 7/1971 | Diforte | 224/315 |
| 4,189,054 | A | * | 2/1980 | Liu et al. | 220/4.23 |
| 4,932,573 | A | | 6/1990 | Flint | |
| 4,993,609 | A | * | 2/1991 | Flint | 296/37.3 |
| 5,809,606 | A | | 9/1998 | MacDonald et al. | |
| 5,823,413 | A | * | 10/1998 | Seltz | 224/42.2 |
| 6,499,591 | B1 | | 12/2002 | Rizzo et al. | |
| 6,648,577 | B1 | * | 11/2003 | Obriot | 296/37.3 |
| 6,739,641 | B1 | * | 5/2004 | McLeod et al. | 296/37.2 |

FOREIGN PATENT DOCUMENTS

| DE | 20117190 U | 1/2002 |
|---|---|---|
| GB | 2282578 A | 4/1995 |
| GB | 2346848 A | 8/2000 |

* cited by examiner

Primary Examiner—Hau Phan
(74) Attorney, Agent, or Firm—Bachman & LaPointe

(57) ABSTRACT

A detachable wheel cover for a trolley, pushchair or the like has a substantially cylindrical part which is adapted to fit around the periphery of a wheel, a first side adapted to cover one side of the wheel and a second side adapted to cover the other side of the wheel. The edges of the sides are secured to the edges of the substantially cylindrical part by stitching and/or adhesive. An opening which is closable by a flap is provided in the side so that the wheel can be inserted into the cover. Once the wheel has been inserted, the flap can be folded to close the opening and the flap can be held in position by a releasable fastener such as "Velcro" (Registered Trade Mark). An axle on which the wheel is mounted extends through a small central aperture in a central region of the side of the cover.

7 Claims, 1 Drawing Sheet

DETACHABLE WHEEL COVER

BACKGROUND OF THE INVENTION (1) Field of the Invention

This invention relates to covers for the wheels of trolleys such as golf trolleys or for the wheels of pushchairs and the like.

(2) Prior Art

A problem frequently encountered by golfers is that having played a round of golf, the wheels of the trolley carrying the golfer's clubs have become dirty. The golfer must therefore either clean the wheels or provide a mat or the like to prevent the boot of the vehicle in which the trolley is to be carried from becoming soiled. In either case, the trolley can move while the vehicle, in which the trolley is being carried, is being driven and dirt can shake loose from the wheels of the trolley and soil the vehicle.

The same problem arises with foldable pushchairs and the present invention seeks to provide a solution to the problem.

SUMMARY OF THE INVENTION

According to the invention, there is provided a cover for a wheel of a trolley, pushchair or the like, which cover comprises a substantially cylindrical part which is adapted to fit around the periphery of a wheel for which the cover is intended, a first side adapted to cover one side of the wheel and a second side adapted to cover the other side of the wheel, the substantially cylindrical part being joined to or formed integrally with the first and second sides of the cover and a closable opening being provided whereby a wheel can be inserted into the cover through the opening and said opening then being closed by releasable fastening means; wherein the opening is provided in one of the sides of the cover.

According to a preferred embodiment of the invention, the opening is provided in a side of the cover which is intended, in use, to cover the side of the wheel from which an axle on which the wheel is mounted extends. Desirably, the opening can be closed by a flap which extends over an arc of the side of the cover and which can be releasably fastened to the substantially cylindrical part or to the side of the cover. In this manner, the flap can be released from the cover, the cover can be fitted around the wheel and the flap then fastened to the cover to enclose the wheel. The axle on which the wheel is mounted extends through a small part of the opening in a central region of the side of the cover.

The releasable fastening means may take any suitable form such as press studs, a sliding clasp fastener or co-operating engageable strips such as those sold under the Registered Trade Mark "Velcro".

BRIEF DESCRIPTION OF THE DRAWINGS

The invention will now be described in detail, by way of example, with reference to the drawings in which:—

In the drawings, like parts are denoted by like reference numerals.

DETAILED DESCRIPTION OF THE PREFERRED EMBODIMENT(S)

Figure 1:
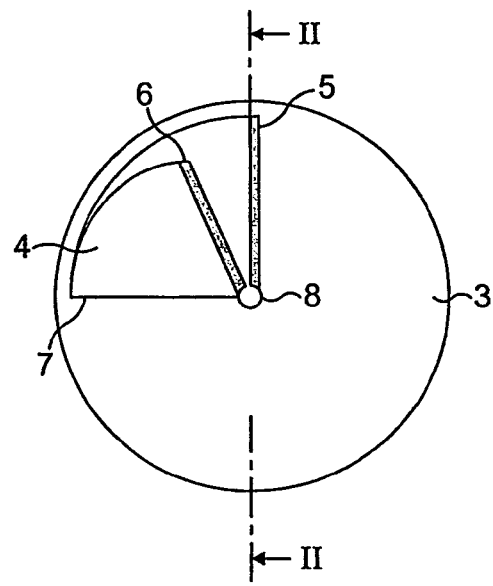
FIG. 1 is a side elevation of one embodiment of a wheel cover according to the invention.
Figure 2:
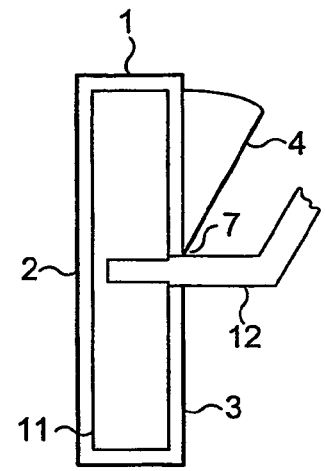
FIG. 2 is a section taken on the line II—II in FIG. 1 in the direction of the arrows, but showing the cover fitted to a wheel.

Reference will first be made to FIGS. 1 and 2 of the drawings in which a wheel cover according to the invention comprises a substantially cylindrical part 1 which is adapted to fit around the periphery of a wheel 11 as shown in FIG. 2. A first side panel 2 is secured, for example by means of stitching and/or an adhesive to one edge of the part 1. A second side panel 3 is secured, again for example by means of stitching and/or an adhesive, to the opposite edge of the part 1. The side panel 3 has a sector region extending over about 45° and formed in the shape of a flap 4 which is hinged to the remainder of the side panel 3. The flap 4 can be held in position by means of, for example, a "Velcro" (Registered Trade Mark) fastener, one strip 5 of which is secured to the side panel 3 adjacent to the opening accommodating the flap 4 and the other strip 6 of which is secured to a side edge of the flap remote from the hinged edge 7.

In use, the flap 4 is folded down about the hinge 7, after the strips 5 and 6 of the fastener have been separated from one another, and the wheel cover is fitted over the wheel 11 of a golf trolley or the like as shown in FIG. 2 of the drawings. The side panel 3 has a central aperture 8 to accommodate an axle 12 on which the wheel 11 is mounted. Once the wheel cover has been fitted onto the wheel, the flap 4 can be pivoted about the hinge 7 to close the opening and the flap can be held in place by the strips 5 and 6 of the fastener.

The wheel cover can be removed from the wheel 11, simply by separating the strips 5 and 6 of the fastener, folding down the flap 4 and stripping the cover off the wheel.

Figure 3:
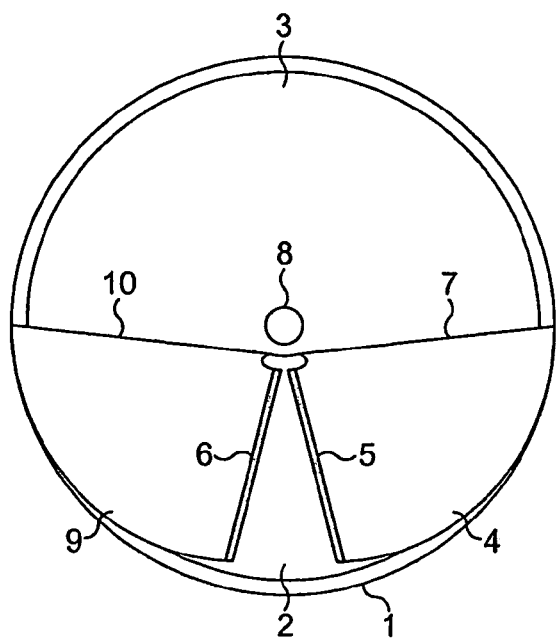
FIG. 3 is a side elevation of another embodiment of a wheel cover according to the invention.

The embodiment shown in FIG. 3 differs from the embodiment shown in FIGS. 1 and 2 in that a second flap 9 is provided which is hinged at 10 to the side panel 3. In this case, one strip 5 of the "Velcro" (Registered Trade Mark) fastener is secured to the flap 4 while the other strip 6 is secured to the other flap 9. The wheel cover can be fitted to a wheel in a similar manner to the cover shown in FIGS. 1 and 2 except that, in this case, both flaps 4 and 9 are folded back while the cover is fitted over a wheel and the flaps are then folded back and held in place by the enter-engaging strips 5 and 6 of the fastener.

The side panel 2 can be covered by advertising or promotional material.

The covers can be made of any suitable material but a flexible and waterproof material is preferred such as a suitable synthetic plastics material.

The invention is not restricted to the above described embodiment but variations and modifications may be made without departing from the scope of the invention. For example, the substantially cylindrical part 1 need not be secured to the side panels 2 and 3 but could be formed integrally with at least one of the side panels.

It will be seen that the wheel cover according to the invention can readily be fitted to a wheel of a golf trolley before the trolley is put into a vehicle and will thus prevent the vehicle from becoming soiled by the wheel. Of course, a separate wheel cover should be fitted to each of the wheels of the trolley. Further, the invention is not restricted to wheel covers for golf trolleys. The wheel covers can be used for the wheels of other articles such as pushchairs.

The invention claimed is:

1. A cover for a wheel, said cover comprising a substantially cylindrical part which is adapted to fit around a periphery of the wheel for which the cover is intended, a first side for covering one side of the wheel and a second side for covering the other side of the wheel, the substantially cylindrical part being joined to the first and second sides of the cover and a closable opening being provided whereby, the wheel can be inserted into the cover through the closable opening and said closable opening then being closed by releasable fastening means, wherein the closable opening is provided in one of the sides of the cover, which side is intended in use to cover the side of the wheel from which an axle on which the wheel is mounted extends, wherein the opening is closable by a pair of flaps which extend over an arc of said side of the cover in which the opening is provided and which are releasably fastened to said side in which the opening is provided and the substantially cylindrical part of the cover to close said opening, each said flap extending over approximately one half of the arc of said opening and the flaps being provided with releasable fastening means whereby said flaps can be releasably secured together to close the opening.

2. A cover according to claim 1, wherein the substantially cylindrical part is formed integrally with the first and second sides of the cover.

3. A wheel cover according to claim 1, wherein the arc is approximately 90°.

4. A wheel cover according to claim 1, wherein a small part of the opening in a central region of the side of the cover is arranged to remain open in the closed position of the cover to accommodate the axle on which the wheel is mounted when the wheel cover is in use.

5. A wheel cover according to claim 1, wherein at least one of advertising and promotional material is applied to the other side of the cover.

6. A wheel cover according to claim 1, wherein the releasable fastening means comprise at least one of press studs, at least one sliding clasp fastener, and at least one pair of co-operating engageable strips.

7. A wheel cover according to claim 1, wherein the cover is made of at least one of a flexible and waterproof material and a synthetic plastics material.

* * * * *